(12) United States Patent
Lee et al.

(10) Patent No.: US 11,995,372 B2
(45) Date of Patent: May 28, 2024

(54) DISPLAY APPARATUS AND CONTROL METHOD THEREFOR

(71) Applicant: SAMSUNG ELECTRONICS CO., LTD., Suwon-si (KR)

(72) Inventors: Kwangbok Lee, Suwon-si (KR); Byeongcheol Hyeon, Suwon-si (KR); Sangwon Kim, Suwon-si (KR); Youngkook Kim, Suwon-si (KR); Jeongryeol Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/990,239

(22) Filed: Nov. 18, 2022

(65) Prior Publication Data

US 2023/0078940 A1    Mar. 16, 2023

Related U.S. Application Data

(63) Continuation of application No. PCT/KR2021/001393, filed on Feb. 3, 2021.

(30) Foreign Application Priority Data

May 25, 2020 (KR) .................... 10-2020-0062493

(51) Int. Cl.
  *G06F 3/14* (2006.01)
  *G06F 3/147* (2006.01)
  *G06F 13/36* (2006.01)

(52) U.S. Cl.
  CPC ............ *G06F 3/1446* (2013.01); *G06F 3/147* (2013.01); *G06F 13/36* (2013.01); *G06F 2213/40* (2013.01)

(58) Field of Classification Search
  CPC ........ G06F 3/1446; G06F 3/147; G06F 13/36; G06F 2213/40; G06F 13/40; G06F 13/4027; G06F 13/4068; G09G 2360/04
  See application file for complete search history.

(56) References Cited

U.S. PATENT DOCUMENTS 8,018,425 B2    9/2011   Oh et al.
9,070,315 B2    6/2015   Hong et al.
(Continued)

FOREIGN PATENT DOCUMENTS

JP    2017-207580 A    11/2017
KR    10-0679410 B1    2/2007
(Continued)

OTHER PUBLICATIONS

International Search Report (PCT/ISA/210) dated May 17, 2021 by the International Searching Authority in PCT/KR2021/001393.
(Continued)

*Primary Examiner* — Ibrahim A Khan
(74) *Attorney, Agent, or Firm* — Sughrue Mion, PLLC

(57) ABSTRACT

A display apparatus and a control method therefor are provided. The display apparatus includes: a plurality of display modules; and one or more processors configured to control the plurality of display modules to display an image, wherein a first display module of the plurality of display modules includes a first connector which is connected to the one or more processors, wherein the first display module is configured to receive a first image signal through a first pin of the first connector from the one or more processors, receive a second image signal through a second pin of the first connector, and display an image based on the first image signal, wherein a second display module of the plurality of display modules includes a second connector which is connected to the first display module, wherein the second display module is configured to receive the second image
(Continued)

signal through a first pin of the second connector from the first display module, and display an image based on the second image signal, and wherein the second pin of the first connector is electrically connected to the first pin of the second connector.

11 Claims, 18 Drawing Sheets

(56) References Cited

U.S. PATENT DOCUMENTS

| | | | |
|---|---|---|---|
| 9,814,109 B2 | 11/2017 | Dhayagude et al. | |
| 9,818,350 B2* | 11/2017 | Sohn | G09G 3/36 |
| 9,996,893 B2 | 6/2018 | Lee et al. | |
| 2005/0264471 A1* | 12/2005 | Yamazaki | G06F 3/1438 345/1.1 |
| 2009/0278985 A1 | 11/2009 | Chan | |
| 2010/0085485 A1 | 4/2010 | Kim et al. | |
| 2010/0106878 A1* | 4/2010 | Ho | H04N 21/43632 710/301 |
| 2011/0080382 A1 | 4/2011 | Koo | |
| 2011/0267328 A1* | 11/2011 | Venkatasubramanian | G06F 3/1446 345/211 |
| 2013/0088453 A1 | 4/2013 | Park et al. | |
| 2016/0188278 A1* | 6/2016 | Lee | G09G 5/391 345/1.3 |
| 2016/0329030 A1* | 11/2016 | Lee | G06T 1/20 |
| 2016/0335039 A1* | 11/2016 | Cho | G06F 3/1446 |
| 2018/0165051 A1* | 6/2018 | Kim | G09G 5/14 |
| 2019/0155777 A1* | 5/2019 | Shim | G06F 13/4068 |
| 2020/0225903 A1* | 7/2020 | Cohen | G09G 5/12 |
| 2020/0320910 A1* | 10/2020 | Horibe | G06F 1/1647 |
| 2021/0059060 A1* | 2/2021 | Seo | H05K 5/0247 |
| 2021/0165626 A1* | 6/2021 | Yamamoto | G06F 3/1446 |
| 2022/0188058 A1* | 6/2022 | Kim | H04W 4/023 |

FOREIGN PATENT DOCUMENTS

| | | |
|---|---|---|
| KR | 10-0790715 B1 | 1/2008 |
| KR | 10-2009-0117652 A | 11/2009 |
| KR | 10-2010-0039743 A | 4/2010 |
| KR | 10-2010-0075636 A | 7/2010 |
| KR | 10-2011-0037339 A | 4/2011 |
| KR | 10-1343586 B1 | 12/2013 |
| KR | 10-1418141 B1 | 7/2014 |
| KR | 10-2016-0131673 A | 11/2016 |
| KR | 10-2018-0068470 A | 6/2018 |
| KR | 10-2020-0007167 A | 1/2020 |
| WO | 2020/013401 A1 | 1/2020 |

OTHER PUBLICATIONS

Written Opinion (PCT/ISA/237) dated May 17, 2022 by the International Searching Authority in International Application No. PCT/KR2021/001393.

* cited by examiner

| 100-1 | 100-2 | 100-3 | 100-4 |
| 100-5 | 100-6 | 100-7 | 100-8 |
| 100-9 | 100-10 | 100-11 | 100-12 |
| 100-13 | 100-14 | 100-15 | 100-16 |

DISPLAY APPARATUS AND CONTROL METHOD THEREFOR

CROSS-REFERENCE TO RELATED APPLICATIONS

This application is a bypass continuation of International Application No. PCT/KR2021/001393, filed on Feb. 3, 2021, which is based on and claims priority to Korean Patent Application No. 10-2020-0062493, filed on May 25, 2020, in the Korean Intellectual Property Office, the disclosures of which are incorporated by reference herein in their entireties.

BACKGROUND

1. Field

The disclosure relates to a display apparatus and a control method therefor, and more particularly, to a display apparatus included in a modular display apparatus and a control method therefor.

2. Description of Related Art

With recent developments in electronic technology, a variety of electronic apparatuses are being developed. In particular, one area relates to development of a modular display apparatus in which a plurality of distinct display apparatuses are coupled together.

Because such a modular display apparatus may be able to display images in a larger format by coupling together portions of these larger images on a plurality of smaller display apparatuses, users may perceive a sense of visual awe and satisfaction superior to conventional displays.

Each display apparatus of the modular display apparatus of the related art includes a processor (e.g., timing controller) which generates an LED driving signal, and an additional processor that transmits the LED driving signal to a plurality of display modules included in each display apparatus through a peer to peer method.

Accordingly, as the number of display modules increases, the number of processors needed for controlling the plurality of display modules may also increase and that may increase both cost and power consumption.

In addition, a processor capable of processing resolutions greater than the number of pixels in which the processor may be mounted in the display apparatus, may result in a lack of efficiency by not being able to take advantage of the full specified capabilities of the processor.

SUMMARY

Provided are a display apparatus which may reduce cost and power consumption by minimizing a number of processors included in the display apparatus, and is capable of effectively using the specified capabilities of the reduced number of processors, and a control method therefor.

According to an aspect of the disclosure, a display apparatus includes: a plurality of display modules; and one or more processors configured to control the plurality of display modules to display an image, wherein a first display module of the plurality of display modules includes a first connector which is connected to the one or more processors, wherein the first display module is configured to receive a first image signal through a first pin of the first connector from the one or more processors, receive a second image signal through a second pin of the first connector, and display an image based on the first image signal, wherein a second display module of the plurality of display modules includes a second connector which is connected to the first display module, wherein the second display module is configured to receive the second image signal through a first pin of the second connector from the first display module, and display an image based on the second image signal, and wherein the second pin of the first connector is electrically connected to the first pin of the second connector.

Each display module of the plurality of display modules may include an integrated circuit (IC) chip configured to display an image by processing an image signal received through a first pin of a connector of a corresponding display module.

The first display module may include a third connector, and the second pin of the first connector may be electrically connected to a first pin of the third connector.

The first pin of the second connector may electrically connected to the first pin of the third connector.

The second pin of the first connector and the first pin of the third connector may be electrically connected through a shifted pattern.

The second image signal may be bypassed from the second pin of the first connector to the first pin of the third connector.

The display apparatus of may further include a bridge board electrically connected to the one or more processors and the first display module, and configured to transmit the first and second image signals received from the one or more processors to the first display module.

The bridge board may be connected to at least two display modules from among the plurality of display modules, and may be further configured to transmit a plurality of image signals received from the one or more processors to the at least two display modules.

The one or more processors may be further configured to: generate, based on identification information of the plurality of display modules, a plurality of image signals corresponding to the plurality of display modules, the plurality of image signals including the first image signal corresponding to the first display module and the second image signal corresponding to the second display module, and transmit, to the first display module, the first image signal corresponding to the first display module and the second image signal corresponding to the second display module.

According to an aspect of the disclosure, a control method of a display apparatus including a plurality of display modules, includes: transmitting a first image signal to a first display module of the plurality of display modules, and transmitting a second image signal to a second display module of the plurality of display modules connected to the first display module through the first display module; and displaying an image based on the first image signal through the first display module, and displaying an image based on the second image signal through the second display module, wherein the first display module may include a first connector, and the first display module is configured to receive the first image signal through a first pin of the first connector, and receive the second image signal through a second pin of the first connector, wherein the second display module may include a second connector, and the second display module is configured to receive the second image signal through a first pin of the second connector from the first display module, and wherein the second pin of the first connector is electrically connected to the first pin of the second connector.

Each display module of the plurality of display modules may include an integrated circuit (IC) chip configured to display an image by processing an image signal received through a first pin of a connector of a corresponding display module.

The first display module may include a third connector, and the second pin of the first connector may be electrically connected to a first pin of the third connector.

The first pin of the second connector may be electrically connected to the first pin of the third connector.

The second pin of the first connector and the first pin of the third connector may be electrically connected through a shifted pattern.

The second image signal may be bypassed from the second pin of the first connector to the first pin of the third connector.

According to one or more embodiments of the disclosure as described above, cost and power consumption may be reduced by minimizing a number of processors included in a display apparatus, and a specification of a processor may be effectively used.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1C is a diagram illustrating a modular display apparatus in which a display apparatus is coupled according to an embodiment;

DETAILED DESCRIPTION

Terms used in the disclosure and the claims are general terms selected considering their function herein. However, the terms may change depending on intention, legal or technical interpretation, emergence of new technologies, and the like of those skilled in the related art. In addition, there may be terms arbitrarily selected. These terms may be interpreted according to a meaning defined in the disclosure, and may be interpreted based on an overall content of the disclosure and a common technical knowledge in the related art, unless otherwise specified.

In addition, in describing the disclosure, in case it is determined that the detailed Description herein of related known technologies that may unnecessarily cause confusion with respect to the below description of the disclosed embodiments have been omitted for clarity.

Further, although embodiments of the disclosure have been described in detail below with references to the accompanying drawings and descriptions describing the accompanying drawings, it should be noted that the various embodiments are not for limiting the scope of the disclosure.

The embodiments of disclosure will be described in detail below with reference to the accompanied drawings.

FIG. 1A to FIG. 1D are diagrams illustrating a display apparatus according to an embodiment of the disclosure.

The display apparatus 100 according to an embodiment may include one or a plurality of display modules.

Figure 1A:
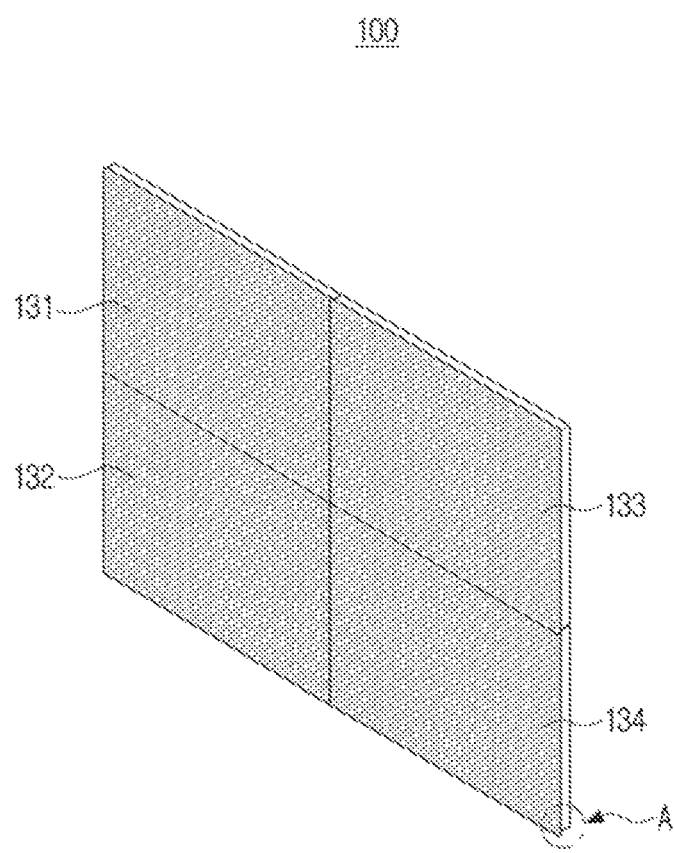
FIG. 1A is a diagram illustrating a display apparatus according to an embodiment.

For example, referring to FIG. 1A, the display apparatus 100 according to an embodiment may include four display modules 131 to 134. Here, each of the display modules 131 to 134 may be physically connected and form one display.

Each of the display modules 131 to 134 may be implemented as an LED display module which includes inorganic light emitting diodes (LEDs).

Figure 1B:
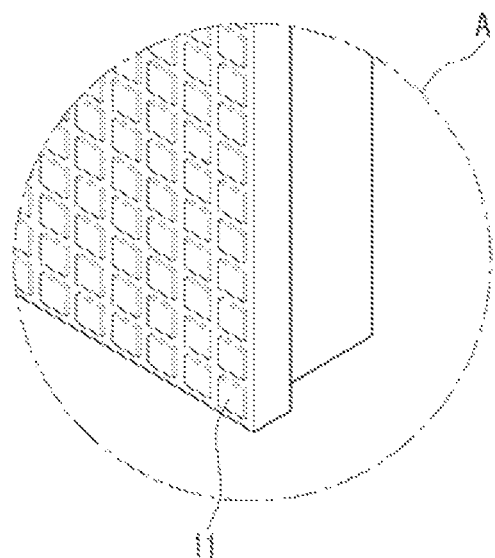
FIG. 1B is a diagram illustrating a pixel of a display apparatus according to an embodiment.

Specifically, referring to FIG. 1B, each of the display modules 131 to 134 may be implemented as the LED display module which includes a plurality of LEDs 11, in which sub pixels of a red LED, a green LED, and a blue LED are implemented together as one single pixel.

Here, a plurality of pixels may be arrayed in a matrix format (e.g., M×N, where M and N may be natural numbers). Specifically, a matrix may not only be a square array format (e.g., M=N, where M and N are natural numbers such as in a 16×16 array or a 24×24 array), but also be in an non-square array format (e.g., M≠N, where M and N are natural numbers such as 16×24 array).

In some embodiments, each LED of the LED display module may be implemented as a micro LED. The micro LED may be an LED of about 5-100 micrometers in size, and be arranged as an ultra-small light-emitting device which may emit light on its own without a color filter.

Alternatively, and the display module may be implemented as a liquid crystal panel (LCD), an organic LED (OLED), an active-matrix OLED (AMOLED) panel, a plasma display panel (PDP), or other flat display panels. While any of these display panels may be used, the display module in the below description is with respect to a LED display module.

Referring back to FIG. 1A, the display apparatus 100 according to an embodiment of the disclosure may be implemented in a format in which the plurality of display modules 131 to 134 may be coupled in a 2×2 array.

Here, the LED display module in the 2×2 array is merely one embodiment, and the array format and number of the LED display module may be variously modified.

The display apparatus 100 may be coupled at a docking station of a modular display apparatus 1000. To this end, the display apparatus 100 may include a coupling part to be coupled at the docking station. The coupling part may be made of a magnetic material, and the display apparatus 100 may be coupled with magnetic material on the docking station. However, this is merely one embodiment, and the display apparatus 100 may be coupled to the docking station of the modular display apparatus 1000 through other various the coupling parts such as screws, clamps, slices, or fixation devices.

Accordingly, the modular display apparatus 1000 in which a plurality of display apparatuses 100 are coupled together may be implemented. In some embodiments, the modular display apparatus 1000 may be designated, for example, as a wall display or a video wall.

For example, referring to FIG. 1C, the modular display apparatus 1000 may be implemented in which the plurality of display apparatuses 100-1 to 100-16 are coupled in a 4×4 format at the docking station. Here, the modular display apparatus 1000 in a 4×4 array is merely one embodiment, and the array format and number of the display apparatus may be variously modified.

The modular display apparatus 1000 may display an image through the display module included in each of the plurality of display apparatuses. The image displayed on the modular display apparatus may be, for example, an image received from an external device (e.g., a set top box, a computer, a server), or an image pre-stored within the modular display apparatus 1000.

Figure 1D:
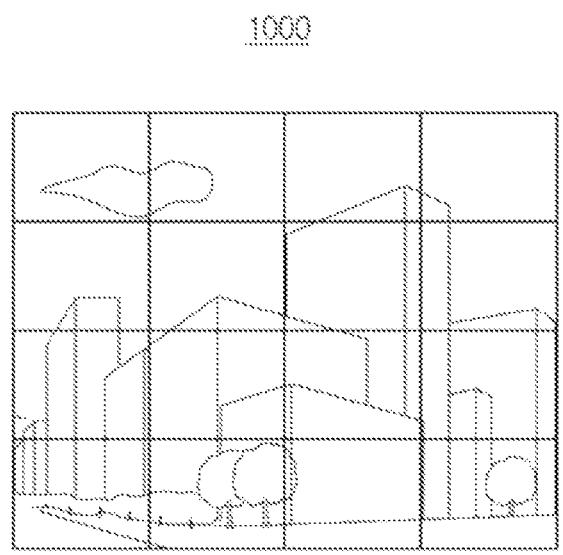
FIG. 1D is a diagram illustrating a modular display apparatus displaying an image according to an embodiment.

Specifically, a processor included in the modular display apparatus 1000 may be configured to transmit an image signal corresponding to each display apparatus to the plurality of display apparatuses, and the plurality of display apparatuses may display the image based on the received image signal. Accordingly, as shown in FIG. 1D, the modular display apparatus 1000 may display the image through the plurality of display apparatuses.

The display apparatus 100 of the disclosure may be one from among the plurality of display apparatuses included in the modular display apparatus 1000, and may be designated as a sub screen or a cabinet.

Figure 2:
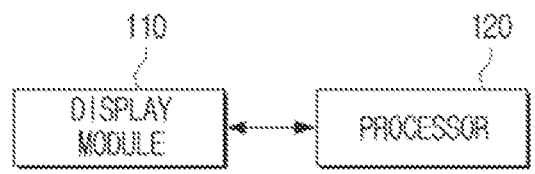
FIG. 2 is a block diagram illustrating a display apparatus according to an embodiment.

FIG. 2 is a block diagram illustrating the display apparatus according to an embodiment of the disclosure.

Referring to FIG. 2, the display apparatus 100 according to an embodiment of the disclosure may include a display module 110 and a processor 120. The display apparatus 100 may be one from among the plurality of display apparatuses included in the modular display apparatus, and the display module 110 may include a plurality of display modules 110.

The display module 110 may display various images. The image may be a still image or a moving image, and the display module 110 may display various images such as, for example, and without limitation, broadcast content, multimedia content, user generated content, and imagery from a variety of other sources. The display module 110 may also display a user interface (UI) and an icon.

Specifically, the display module 110 may include an integrated circuit (IC) chip, and the IC chip may display an image based on an image signal received from the processor 120. In an example, the IC chip may generate an LED driving signal based on the image signal received from the processor 120, and the image may be displayed by controlling an emission of the plurality of pixels included in the display module 110 based on the LED driving signal. According to an embodiment, the IC chip may be an LED driver IC chip.

As described above, the display module 110 may be implemented as a display module of various formats such as, for example, and without limitation, light emitting diodes (LEDs), a liquid crystal display (LCD) panel, organic light emitting diodes (OLEDs), a liquid crystal on silicon (LCoS), a digital light processing (DLP), laser TV, and electronic displays. In addition, in the display module 110, a driving circuit, which may be implemented in the form of an a-Si thin film transistor (TFT), a low temperature poly silicon (LTPS) TFT, an organic TFT (OTFT), a metal-oxide-semiconductor field-effect transistor (MOSFET) or other electrical circuits to power and control pixels. A backlight unit, and other display circuitry may be included.

The display module 110 may be coupled with a touch sensing part and implemented as a touch screen.

The processor (or, one or more processors) 120 may control the overall operation of the display apparatus 100. To this end, the processor 120 may include at least one from among a central processing unit (CPU), an application processor (AP), or a communication processor (CP). Alternatively, the processor 120 may be a timing controller or a field programmable gate array (FPGA) which is designed or programmed to implement various functions which will be described below. Here, the FPGA may be included in a timing controller board, but it is not necessarily limited thereto.

The processor 120 may control hardware or software elements connected to the processor 120 by operating an operating system or an application program, and perform various data processing and calculations. In addition, the processor 120 may load and process commands or data received from at least one from among other elements to a volatile memory, and store the various data in a non-volatile memory.

Figure 3A:
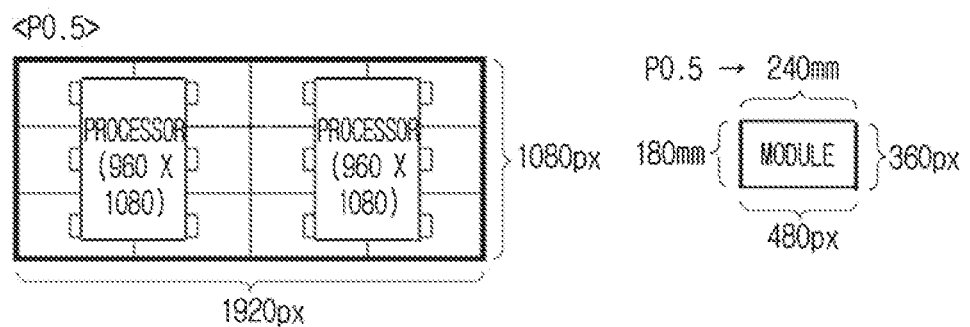
FIG. 3A is a diagram illustrating a display apparatus including a plurality of display modules which have a pixel pitch of 0.5 mm and an array in a 4×3 format.
Figure 3B:
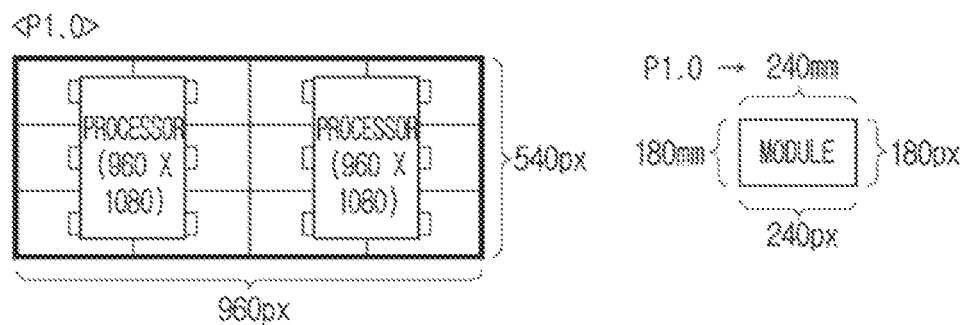
FIG. 3B is a diagram illustrating a display apparatus including a plurality of display modules which have a pixel pitch of 1.0 mm and an array in a 4×3 format.

Referring to FIG. 3A and FIG. 3B, an operation of a display apparatus of the related art will be first described, followed by a description of the operation of the processor 120 of the present disclosure.

FIG. 3A is a diagram illustrating the display apparatus including the plurality of display modules which have a pixel pitch of 0.5 mm and an array in a 4×3 format, and FIG. 3B is a diagram illustrating the display apparatus including the plurality of display modules which have a pixel pitch of 1.0 mm and an array in a 4×3 format.

A processor of the display apparatus of the related art has is configured to transmit an image signal to a plurality of display modules in a peer to peer method. In particular, the plurality of display modules is connected with the processor, and the processor has transmitted the image signal to each of the plurality of display modules.

In an example, as in FIG. 3A, when the plurality of display modules including 480×360 pixels is arrayed in the 4×3 format, the display apparatus includes two processors capable of processing a resolution of 960×1080, and each processor transmits the image signal to the plurality of display modules.

However, the above described arrangement of the related art may lead to several problems.

First, a pixel pitch of the display module may vary for each modular display apparatus. In an example, a first modular display apparatus may include, as shown in FIG. 3A, pixels having a pixel pitch of 0.5 mm in the display module which has a physical size of 180 mm in width and 240 mm in length, and a second modular display apparatus may include, as shown in FIG. 3B, pixels having a pixel pitch of 1.0 mm in the display module which has the same physical size.

In this case, a plurality of processors in the second modular display apparatus may process only a resolution of 960×540 (i.e., each processor processes only a resolution of 480×540) despite each being capable of processing at a resolution of 960×1080. Accordingly, the display apparatus of the related art results in inefficiency of not sufficiently using the full capability of the processor.

In addition, the processor of the display apparatus of the related art may request connection with each display module to transmit the image signal to the plurality of display modules in the peer to peer method.

Accordingly, in the case of the second modular display apparatus described above, there is the problem of having the cost and power consumption associated with having two processors (despite a single processor having the capability to control the plurality of display modules) by having only one processor capable of processing the resolution of 960× 540.

To solve the problems described above, a system capable of transmitting and receiving a signal between the plurality of display modules included in the display apparatus is proposed. The above will be described below with reference to FIG. 4.

Figure 4:
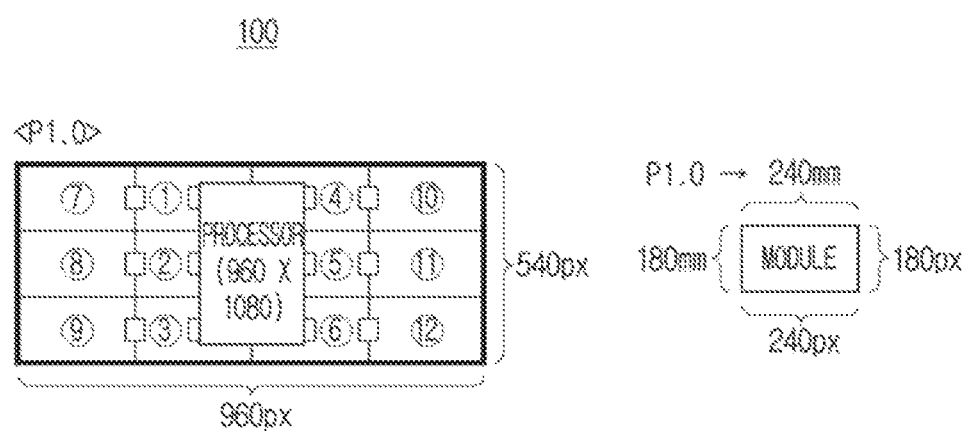
FIG. 4 is a diagram illustrating a display apparatus according to an embodiment.

FIG. 4 is a diagram illustrating the display apparatus according to an embodiment of the disclosure.

The processor 120 may be connected with a first display module from among the plurality of display modules included in the display apparatus 100. In an example, as shown in FIG. 4, based on the display apparatus 100 including display modules 1 to 12, the processor 120 may be connected with display modules 1 to 6. The display module connected with the processor 120 will be referred to as display module A for convenience of description below. That is, in the case of FIG. 4, the display module A may be one from among the display modules 1 to 6.

The display module A may include a connector configured to connect with the processor 120. Here, the connector may not only be connected with the processor 120 in a board to board method, but also connected with the processor 120 through a cable.

Additionally, the display module A may be connected with a second display module from among the plurality of display modules included in the display apparatus 100. For example, as shown in FIG. 4, the display module 1 may be connected with the display module 7, the display module 2 may be connected with the display module 8, the display module 3 may be connected with the display module 9, the display module 4 may be connected with the display module 10, the display module 5 may be connected with the display module 11, and the display module 6 may be connected with the display module 12. The display module that connects with the display module A will be referred to as display module B for convenience of description below. That is, in the case of FIG. 4, the display module B may be one from among the display modules 7 to 12.

To this end, the display module B may include the connector to connect with the display module A. Here, the connector may not only be connected with the display module A in the board to board method, but also connected with the display module A through a cable.

The processor 120 may be configured to transmit an image signal to the display module A. Specifically, the processor 120 may transmit (i) a first image signal (i.e., an image signal corresponding to the display module A) which includes information on an image for displaying in the display module A and (ii) a second image signal (i.e., an image signal corresponding to the display module B) which includes information on an image for displaying in the display module B which is connected to display module A to the display module A.

For example, referring to FIG. 4, the processor 120 may transmit an image signal corresponding to the display module 1 and an image signal corresponding to the display module 7 to the display module 1, transmit an image signal corresponding to the display module 2 and an image signal corresponding to the display module 8 to the display module 2, and transmit an image signal corresponding to the display module 3 and an image signal corresponding to display module 9 to the display module 3. Then, the processor 120 may transmit an image signal corresponding to the display module 4 and an image signal corresponding to the display module 10 to the display module 4, transmit an image signal corresponding to the display module 5 and an image signal corresponding to the display module 11 to the display module 5, and transmit an image signal corresponding to the display module 6 and an image signal corresponding to the display module 12 to the display module 6.

Specifically, the processor 120 may transmit an image signal corresponding to the display module A and an image signal corresponding to the display module B to the display module A through the connector included in the display module A. The embodiment will be described in detail below with reference to FIG. 5.

In FIG. 4, although the display apparatus including the plurality of display modules arrayed in the 4×3 format is shown, other arrangements are possible, such as having the plurality of display modules arrayed in a different format from the above.

In addition, although it has been described as transmitting an image signal in the above, the type of the signal is not limited thereto. For example, the processor 120 may transmit to the display module various other signals such as a signal for controlling the display module.

Figure 5:
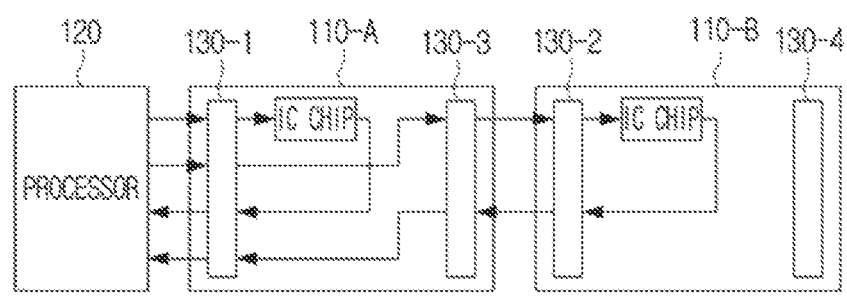
FIG. 5 is a diagram illustrating a signal transmission method of a display apparatus according to an embodiment.

FIG. 5 is a diagram illustrating a signal transmission method of the display apparatus according to an embodiment of the disclosure.

FIG. 5 depicts a part of the display module from among the plurality of display modules included in the display apparatus 100. Display module 110-A may be, as a display module connected to the processor 120, the above described display module A, and display module 110-B may be, as a display module connected to the display module 110-A, the above described display module B.

In an example, the display module 110-A as shown in FIG. 5 may be the display module 4 from among the plurality of display modules as shown in in FIG. 4, and the display module 110-B may be the display module 10 from among the plurality of display modules as seen in FIG. 4. For convenience of description, although a transmission system of a signal of the disclosure is described below with reference to FIG. 5, this transmission system may be applicable to any of the plurality of display modules included in the display apparatus 100.

The processor 120 may transmit an image signal (hereinafter, referred to as a first image signal) corresponding to the display module 110-A and an image signal (hereinafter, referred to as a second image signal) corresponding to the display module 110-B to the display module 110-A through a first connector 130-1 included in the display module 110-A.

Specifically, the first connector 130-1 may include a plurality of pins, and the processor 120 may transmit the first image signal to the display module 110-A through a first pin of the first connector 130-1, and transmit the second image signal to the display module 110-A through a second pin of the first connector 130-1.

The first image signal may be transmitted to the IC chip included in the display module 110-A. To this end, the first pin of the first connector 130-1 may be electrically connected with the IC chip. Then, the IC chip which received the first image signal may display an image based on the first image signal. Specifically, the IC chip may display an image by controlling a driving of the plurality of pixels included in the display module 110-A based on the first image signal. To this end, the IC chip may be implemented as the LED driver IC chip.

The IC chip may be included in each of the plurality of display modules, and may be set (designed or programmed) to display an image by processing the image signal received through a first pin of the connector of each display module.

After the IC chip controls the driving of the plurality of pixels according to the first image signal, LED Open Detection information may be transmitted to the processor 120 through a third pin of the first connector 130-1. Here, the LED Open Detection information may include information on whether or not normal operation of the display module was carried out or whether or not an error generated.

The second image signal may be transmitted to the display module 110-B. Specifically, the display module 110-B may include a second connector 130-2 which connects with the display module 110-A, and the display module 110-B may receive the second image signal from the display module 110-A through a first pin of the second connector 130-2.

Accordingly, the display module 110-A may further include a third connector 130-3 to transmit the second image signal. Then, the second pin of the first connector 130-1 may be electrically connected with a first pin of the third connector 130-3. Specifically, the second pin of the first connector 130-1, as shown in FIG. 5, may be electrically connected with the first pin of the third connector 130-3 through a shifted pattern. The shifted pattern may be a pattern which is arrayed in a column that is shifted, and not a pattern arrayed in one line on a printed circuit board (PCB). Accordingly, the second image signal received through the second pin of the first connector 130-1 may be transmitted to the first pin of the third connector 130-3. Thus, the second image signal may be bypassed from the second pin of the first connector 130-1 to the first pin of the third connector 130-3.

The first pin of the third connector 130-3 may be electrically connected with the first pin of the second connector 130-2. Specifically, the first pin of the third connector 130-3 may be electrically connected with the first pin of the second connector 130-2 through the board to board method or the cable.

Accordingly, the second pin of the first connector 130-1 may be electrically connected with the first pin of the second connector 130-2 through the first pin of the third connector 130-3, and the second image signal transmitted from the second pin of the first connector 130-1 to the first pin of the third connector 130-3 may be transmitted from the first pin of the third connector 130-3 to the first pin of the second connector 130-2.

Then, the second image signal may be transmitted from the first pin of the second connector 130-2 to the IC chip included in the display module 110-B, and the IC chip which received the second image signal may display an image based on the second image signal.

The IC chip may transmit, after controlling the driving of the plurality of pixels according to the second image signal, the LED Open Detection information to the third pin of the third connector 130-3 through the third pin of the second connector 130-2, and the LED Open Detection information may be transmitted from the third pin of the third connector 130-3 to the processor 120 via a fourth pin of the first connector 130-1.

In FIG. 5, although one IC chip is shown as included in each display module, in some embodiments, a plurality of IC chips may be included in each display module.

In addition, although the processor 120 is shown as positioned at a center of the display apparatus 100 in the above, other arrangements are possible, and the position of the processor 120 is not limited thereto. For example, the processor 120 may be disposed at various positions such as, for example, and without limitation, a left side, a right side, a top side, and a bottom side, of the display apparatus 100. If the processor 120 is positioned at the left side of the display apparatus 100, in FIG. 4, the processor 120 may be connected with the display modules 1 to 3 and display modules 7 to 9. Then, the processor 120 may transmit a plurality of image signals corresponding to the display modules 7 to 9 to the display module 7 to 9, transmit a plurality of image signals corresponding to the display modules 1, 4, and 10 to the display module 1, transmit a plurality of image signals corresponding to the display modules 2, 5, and 11 to the display module 2, and transmit a plurality of image signals corresponding to the display modules 3, 6, and 12 to the display module 3. Then, an image signal may be transmitted to each display module according to the application of the technical spirit of FIG. 5 described above, and the plurality of display modules may display an image. In this case, a number of pins of the connector included in each display module may be, for example, at least six, and the number may be greater than when the processor 120 is positioned at the center of the display apparatus 100.

As described above, not only the display module A connected to the processor 120, but also the display module B connected to the display module A may be controlled through the one processor 120. Accordingly, through minimizing the number of processors 120, cost reduction and reduction in power consumption may achieved.

In addition, based on the pixel pitch being 1.0 mm (such as is seen in FIG. 4), the display apparatus of the related art resulted in inefficiency of not sufficiently using the specified capabilities of the processor as in FIG. 3B. In contrast to the deficiencies of the related art (such as is seen in FIG. 3B), a display apparatus according to embodiments of the present disclosure may effectively drive the processor 120 by sufficiently using the specified capabilities of the processor.

Figure 6:
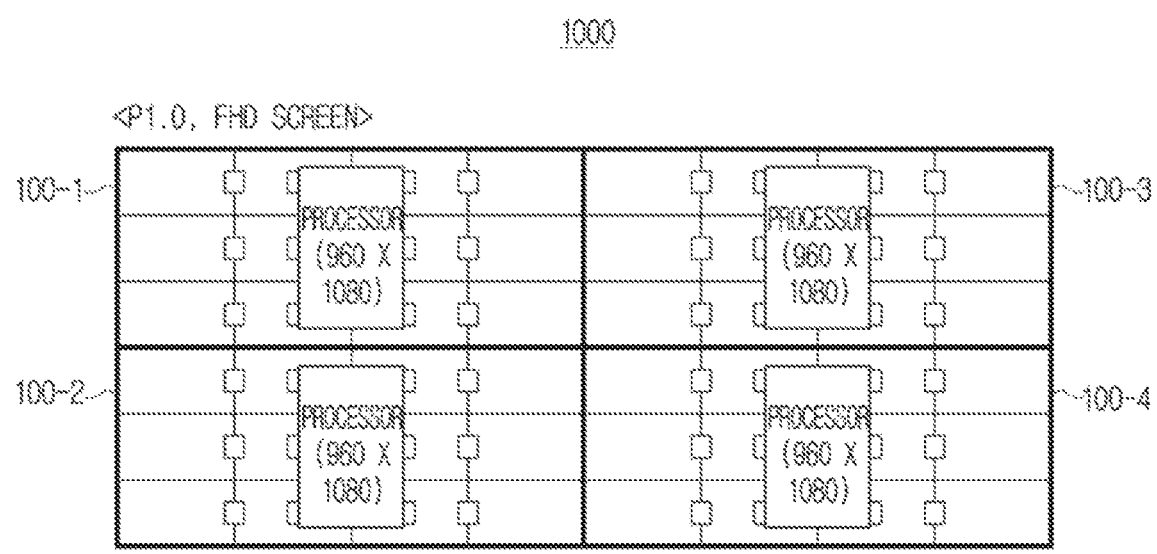
FIG. 6 is a diagram illustrating a modular display apparatus according to various embodiments.

FIG. 6 is a diagram illustrating the modular display apparatus according to various embodiments of the disclosure.

The display apparatus 100 may include a screen of the modular display apparatus 1000 together with others of the plurality of display apparatuses. In an example, referring to FIG. 6, each of the plurality of display apparatuses 100-1, 100-2, 100-3, and 100-4 having a resolution of 960×540 may be coupled at the docking station of the modular display apparatus 1000 and form a screen of the modular display apparatus 1000. Accordingly, the modular display apparatus 1000 may provide a full HD (FHD) screen of 1920×1080 resolution.

The each of the plurality of display apparatuses 100-1, 100-2, 100-3, and 100-4 constituting the modular display apparatus 1000 may receive an image signal corresponding to each display apparatus from the processor (e.g., system board) of the modular display apparatus 1000, and display an image based on the above-described signal transmission system. To this end, the modular display apparatus 1000 may store identification information of each display apparatus, and the processor of the modular display apparatus 1000 may divide the image into the plurality of image signals corresponding to the plurality of display apparatuses based on the identification information of each display apparatus, and transmit the divided plurality of image signals to the plurality of display apparatuses.

Figure 7:
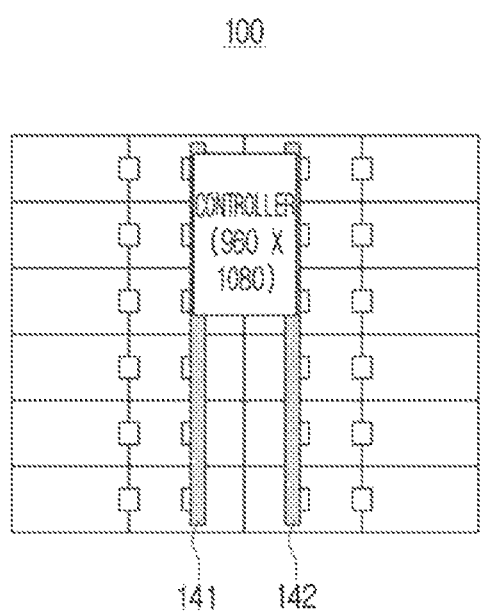
FIG. 7 is a diagram illustrating an embodiment of transmitting a signal through a bridge board according to an embodiment.

FIG. 7 is a diagram illustrating an embodiment of transmitting a signal through a bridge board according to an embodiment of the disclosure.

Referring to FIG. 7, the display apparatus 100 may include the plurality of display modules arrayed in a 4×6 format. Then, the processor 120 may be connected with the first display module from among the plurality of display modules through first and second bridge boards 141 and 142.

Specifically, the processor 120 may be connected with the first and second bridge boards 141 and 142 through a board to board method, as well as through a cable.

Each bridge board may be connected with one display module, or may be connected with at least two of the plurality of display modules.

Specifically, the bridge board may not only be connected with the first display module from among the plurality of display modules in the board to board method, but also connected with the first display module from among the plurality of display modules through a cable.

Referring to FIG. 7, the processor 120 may transmit, through a first bridge board 141, the first and second image signals to the first display module (hereinafter, referred to as display module C) which is connected with the first bridge board 141. The first image signal may be transmitted, through the first bridge board 141, to the first pin of the connector of the display module C which is connected with the first bridge board 141, and the second image signal may be transmitted, through the first bridge board 141, to the second pin of the connector of the display module C which is connected with the first bridge board 141.

Then, the display module C which received the first and second image signals may display an image based on the first image signal, and transmit the second image signal to the second display module (hereinafter, referred to as display module D) which is adjacently disposed. Specifically, similar to the arrangement as seen in FIG. 5, the display module C may transmit the second image signal to the display module D through the shifted pattern. Then, the display module D may display an image based on the second image signal. Because the signal transmission system between the display modules has been described above, repeated description will be omitted herein.

In addition, the processor 120 may transmit the plurality of image signals to the display module in a method similar with the above-described method through a second bridge board 142.

The above may be a system to which the bridge board is added between the processor 120 and the display module 110-A in the signal transmission system (similar to that as is shown in FIG. 5 and described above).

Accordingly, through the one processor 120, the display module extended in a horizontal direction may be controlled, and the display module extended in a vertical direction may also be controlled. Accordingly, the processor 120 may be used more efficiently, and cost and power consumption may be minimized.

Figure 8A:
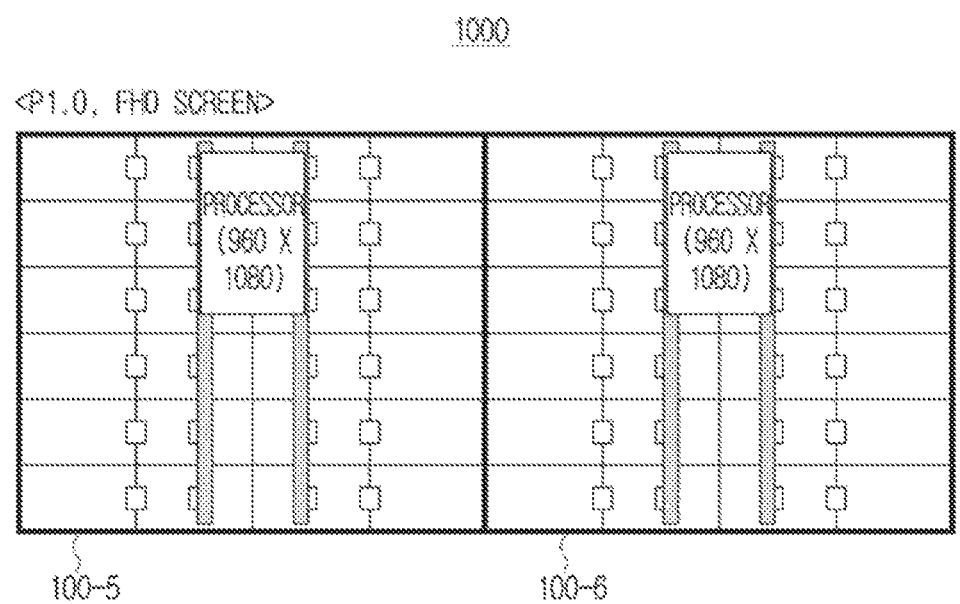
FIG. 8A is a diagram illustrating a modular display apparatus according to various embodiments.
Figure 8B:
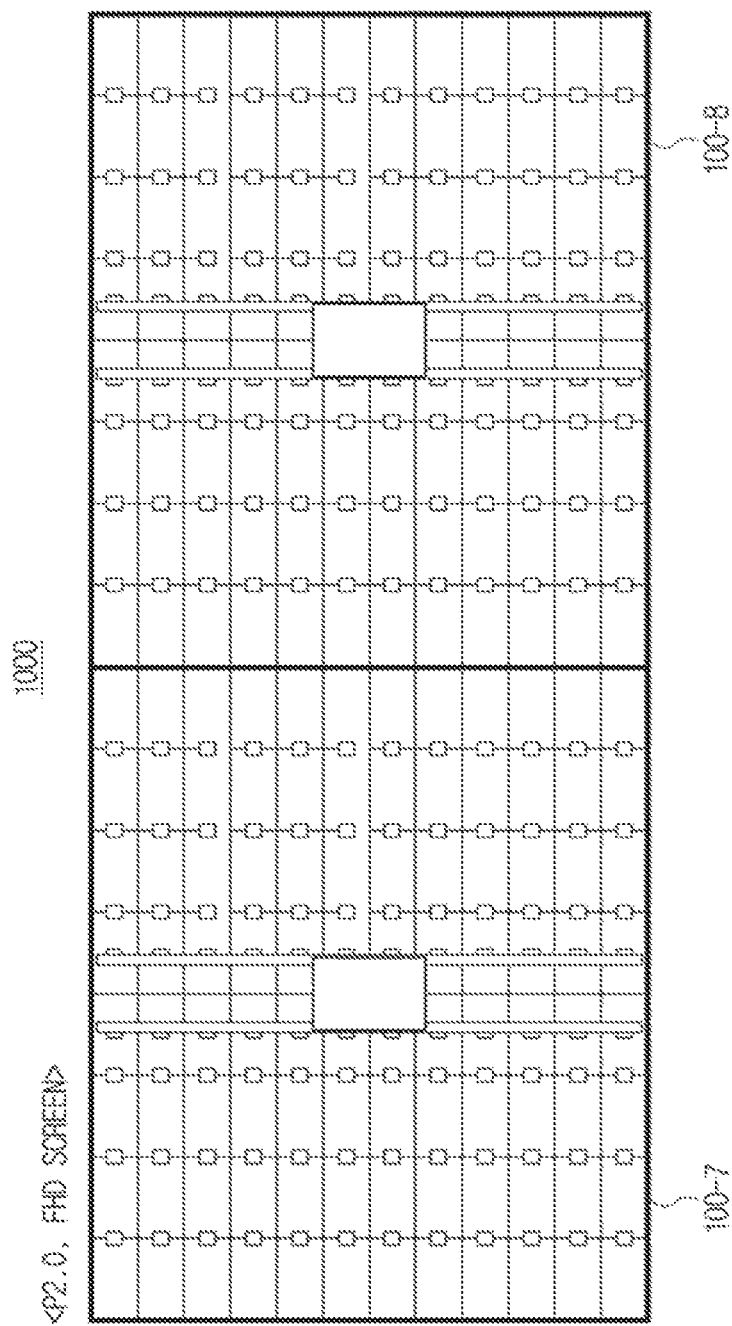
FIG. 8B is a diagram illustrating a modular display apparatus according to various embodiments.

FIG. 8A and FIG. 8B are diagrams illustrating the modular display apparatus according to various embodiments of the disclosure.

The display apparatus 100 of the disclosure may include a screen of the modular display apparatus 1000 together with another of the plurality of display apparatuses. For example, referring to FIG. 8A, each of the plurality of display apparatuses 100-5 and 100-6 (in this case, the pixel pitch may be 1.0 mm) having a resolution of 960×1080 may be coupled at the docking station of the modular display apparatus 1000 and form the screen of the modular display apparatus 1000.

Alternatively, referring to FIG. 8B, each of the plurality of display apparatuses 100-7 and 100-8 (in this case, the pixel pitch may be 2.0 mm) having a resolution of 960×1080 may be coupled at the docking station of the modular display apparatus 1000 and Form the screen of the modular display apparatus 1000.

Accordingly, the modular display apparatus 1000 may provide a FHD screen of 1920×1080.

In the above, although the FHD screen has been provided as an example, the number of pixels integrated in the display module, or the screen according to the number of display modules may be implemented in various resolutions such as a 4K screen or an 8K screen.

Figure 9:
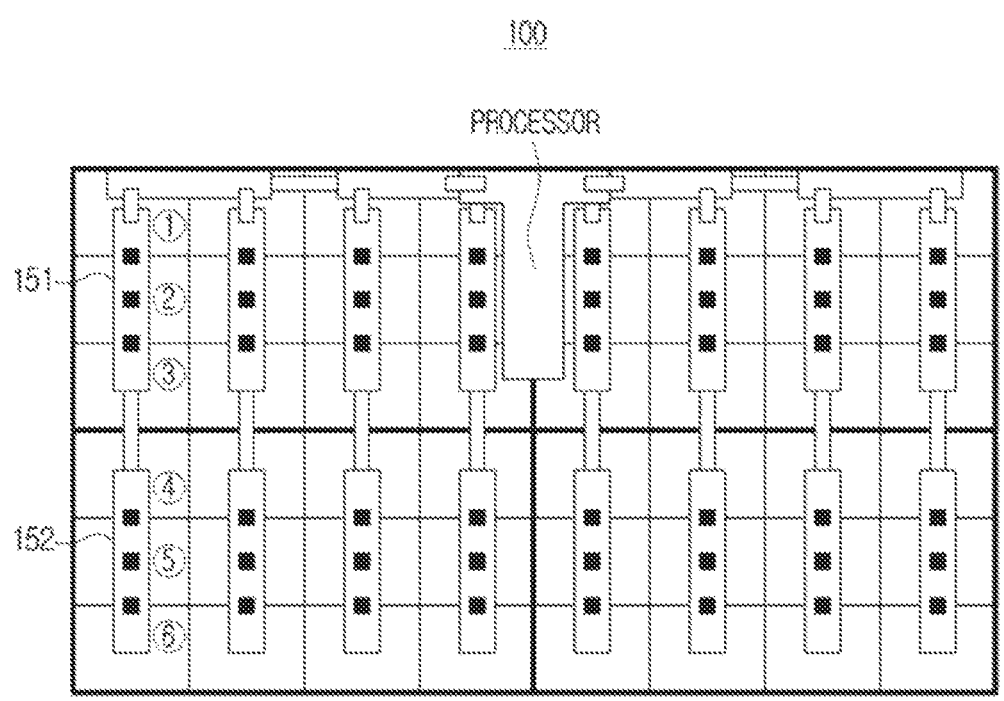
FIG. 9 is a diagram illustrating a display apparatus according to an embodiment.
Figure 10:
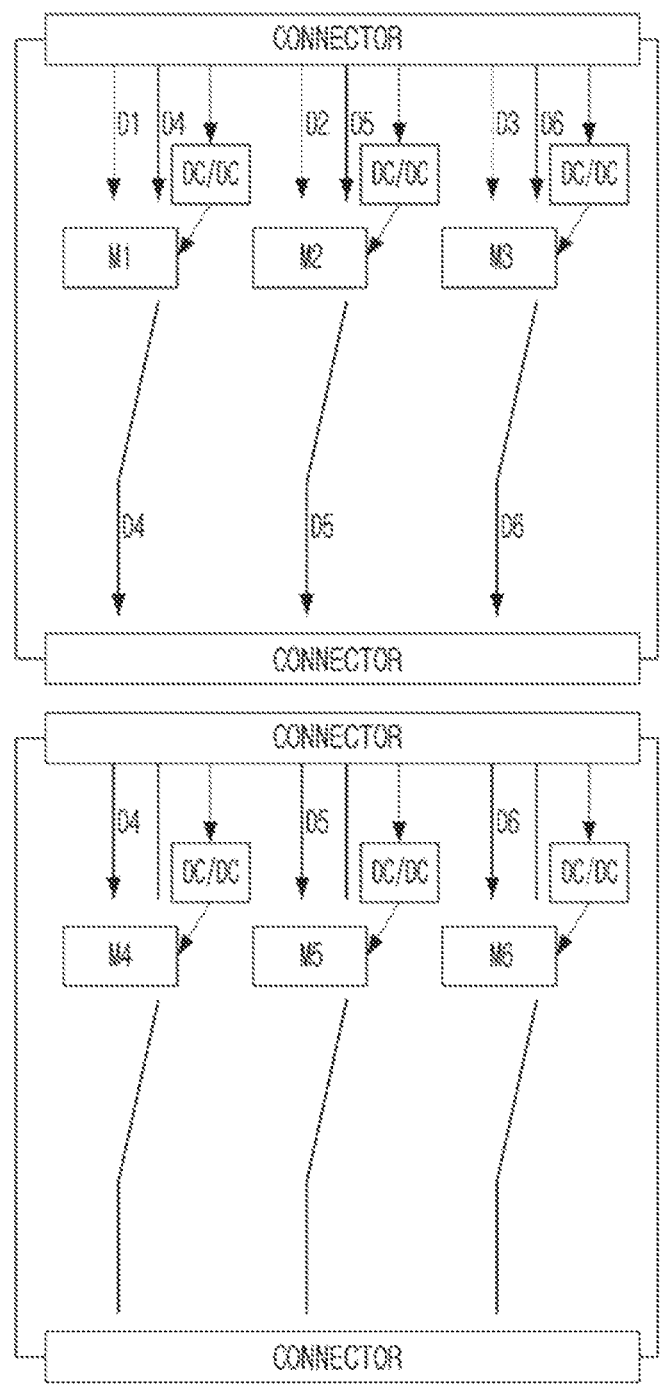
FIG. 10 is a diagram illustrating a signal transmission method according to an embodiment.

FIG. 9 and FIG. 10 are diagrams illustrating the signal transmission method according to an embodiment of the disclosure.

The processor 120 may be electrically connected with the plurality of display modules through a plurality of boards. For example, referring to FIG. 9, the processor 120 may be electrically connected with the display modules 1 to 3 through a first board 151, and electrically connected with the display modules 4 to 6 through a second board 152.

Referring to FIG. 10, although a method of transmitting a signal based on the display modules 1 to 3 which are connected with the first board 151 and the display modules 4 to 6 which are connected to the second board 152 will be described below, a similar method may be applicable to other display modules included in the display apparatus 100.

Referring to FIG. 10, the processor 120 may transmit a first image signal D1 corresponding to a first display module M1 to the first pin of the connector of the first board 151, and transmit a fourth image signal D4 corresponding to a fourth display module M4 to the second pin of the connector of the first board 151. In this case, the first image signal D1 may be transmitted to the first pin of the connector of the first display module M1, and the fourth image signal D4 may be transmitted to the second pin of the connector of the first display module M1.

Then, the processor 120 may transmit a second image signal D2 corresponding to a second display module M2 to the third pin of the connector of the first board 151, and transmit a fifth image signal D5 corresponding to a fifth display module M5 to the fourth pin of the connector of the first board 151. In this case, the second image signal D2 may be transmitted to the first pin of the connector of the second display module M2, and the fifth image signal D5 may be transmitted to the second pin of the connector of the second display module M5.

Then, the processor 120 may transmit a third image signal D3 corresponding to a third display module M3 to a fifth pin of the connector of the first board 151, and transmit a sixth image signal D6 corresponding to a sixth display module M6 to a sixth pin of the connector of the first board 151. In this case, the third image signal D3 may be transmitted to the first pin of the connector of the third display module M3, and the sixth image signal D6 may be transmitted to the second pin of the connector of the third display module M6.

Here, the IC chip included in the first to third display modules may display an image based on the image signal received through the first pin of the connector.

Then, the fourth image signal D4 corresponding to the fourth display module M4 which is transmitted to the second pin of the connector of the first display module M1 through the second pin of the connector of the first board 151 may be transmitted to a first pin of an output connector of the first board 151 through the shifted pattern, and the fourth image signal D4 may be transmitted from the first pin of the output connector of the first board 151 to a first pin of the second board 152. Then, the fourth image signal D4 may be transmitted from the first pin of the second board 152 to the first pin of the connector of the fourth display module M4. Likewise, the fifth image signal D5 corresponding to the fifth display module M5 which is transmitted to the second pin of the connector of the second display module M2 through the fourth pin of the connector of the first board 151 may be transmitted to the third pin of the output connector of the first board 151 through the shifted pattern, and the fifth image signal D5 may be transmitted from the third pin of the output connector of the first board 151 to the third pin of the second board 152. Then, the fifth image signal D5 may be transmitted from the third pin of the second board 152 to the first pin of the connector of the fifth display module M5. Then, the sixth image signal D6 corresponding to the sixth display module M6 which is transmitted to the second pin of the connector of the third display module M3 through the sixth pin of the connector of the first board 151 may be transmitted to the fifth pin of the output connector of the first board 151 through the shifted pattern, and the sixth image signal D6 may be transmitted from the fifth pin of the output connector of the first board 151 to the fifth pin of the second board 152. Then, the sixth image signal D6 may be transmitted from the fifth pin of the second board 152 to the first pin of the connector of the sixth display module M6.

In this case, the IC chip included in the third to sixth display modules may display an image based on the image signal received through the first pin of the connector.

As described above, the display module of the disclosure may transmit the image signal to another display module positioned at a horizontal direction, and accordingly, the modular display apparatus 1000 may display the image.

The processor 120 may transmit a clock signal to the display module that is different than an image signal. To this end, the connector of a board of the display apparatus 100 may further include a pin for transmitting the clock signal, and the connector of the display module may further include a pin for receiving the clock signal.

In addition, as shown in FIG. 10, the connector of the board of the display apparatus 100 and the connector of the display module may further include a pin for transmitting and receiving power.

Figure 11:
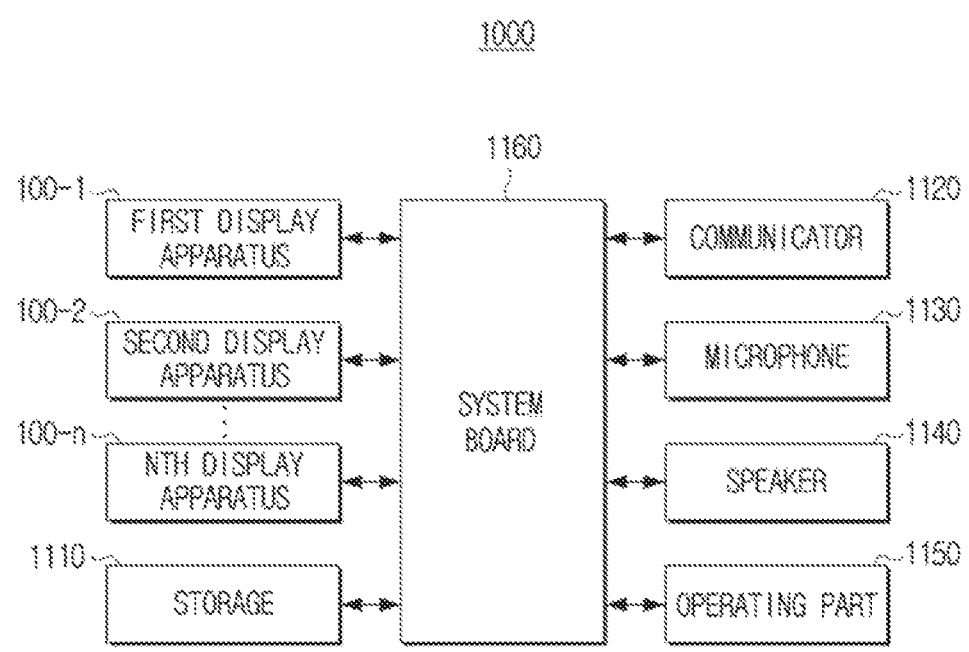
FIG. 11 is a block diagram illustrating a modular display apparatus according to an embodiment.

FIG. 11 is a block diagram illustrating the modular display apparatus according to an embodiment of the disclosure.

Referring to FIG. 11, the modular display apparatus 1000 may include a first display apparatus 100-1, a second display apparatus 100-2 ... an nth display apparatus 100-n, a storage 1110, a communicator 1120, a microphone 1130, a speaker 1140, an operating part 1150, and a system board 1160 (or, processor). Parts overlapping with the above-described description may be omitted or briefly described.

The storage 1110 may store an operating system (OS) for controlling the overall operation of the elements of the modular display apparatus 1000 and command or data associated with the elements of the modular display apparatus 1000.

Accordingly, the system board 1160 may control multiple hardware or software elements of the modular display apparatus 1000 using various commands, data, or the like stored in the storage 1110, load and process commands or data received from at least one from among the other elements in the volatile memory, and store the various data in the non-volatile memory.

The storage 1110 may be implemented in a storage medium. For example, the storage 1110 may be implemented as a storage device such as, for example, and without limitation, a non-volatile memory device such as a read only memory (ROM), a programmable read only memory (PROM), an erasable programmable read only memory (EPROM), and a flash memory, a volatile memory device such as a random access memory (RAM), a hard disk, and/or an optical disc.

The system board 1160 may control the overall operation of the modular display apparatus 1000.

Specifically, the system board 1160 may control the hardware or software elements connected to the system board 1160 by operating the operating system or the application program, and perform various data processing and calculation. In addition, the system board 1160 may load and process commands or data received from the at least one from among the other elements in the volatile memory, and store various data in the non-volatile memory.

To this end, the system board 1160 may execute at least one software program stored in a dedicated processor (e.g., embedded processor) or a memory device for performing the corresponding operation, and may be implemented as a generic-purpose processor (e.g., CPU or application processor) capable of performing the corresponding operation. Then, the system board 1160 may not only be included inside the modular display apparatus 1000, but also included in a control box connected to the modular display apparatus 1000. Further, the system board 1160 may be electrically connected with a plurality of processors of the plurality of display apparatuses 100-1, 100-2, ..., 100-n.

The system board 1160 may divide an image into a plurality of images corresponding to the plurality of display apparatuses to display the image received from an electronic device (e.g., set top box) through each of the plurality of display apparatuses. Then, the system board 1160 may transmit the divided plurality of images to the plurality of display apparatuses.

The communicator 1120 may transmit and receive various data by performing communication with the external device. For example, the communicator 1120 may communicate with the external device such as a smart phone and receive information on an image, or receive a signal for controlling the modular display apparatus 1000 or a signal for controlling the external device. To this end, the communicator 1120 may include a wireless communication chip such as a Wi-Fi chip or a Bluetooth chip.

The microphone 1130 may receive a user voice. Here, the user voice may be a voice for executing a specific function of the modular display apparatus 1000.

Based on the user voice for executing the specific function being received through the microphone 1130, the system board 1160 may convert the user voice to a digital signal through a speech to text (STT) algorithm, and provide response information corresponding to the user voice. Here, the response information may not only be received through an external server, but also generated by the modular display apparatus 1000 itself.

The speaker 1140 may output various audio signals to which various processing operations such as decoding, amplifying, and noise filtering have been performed by an audio processor (not shown). In addition, the speaker 1140 may output various notification sounds or voice messages.

The operating part 1150 may be implemented as a touch screen, a touchpad, a key button, a keypad, or other user interface.

The modular display apparatus 1000 may further include, for example, and without limitation, a USB port to which a USB connector may be connected, various external input ports for connecting with various external terminals such as a headset, a mouse, LAN, and the like, a DMB chip which receives and processes a digital multimedia broadcasting (DMB) signal, and the like.

In addition, the modular display apparatus 1000 may further include, for example, and without limitation, a broadcast receiver (not shown) which receives a broadcast signal from a broadcast company or a satellite via wire or wireless means, a signal separator (not shown) which separates the broadcast signal received from the broadcast receiver (not shown) into an image signal, an audio signal, and additional information signal, an A/V processor (not shown) which performs video decoding and video scaling to the image signal, and performs audio decoding to the audio signal, and the like.

Figure 12:
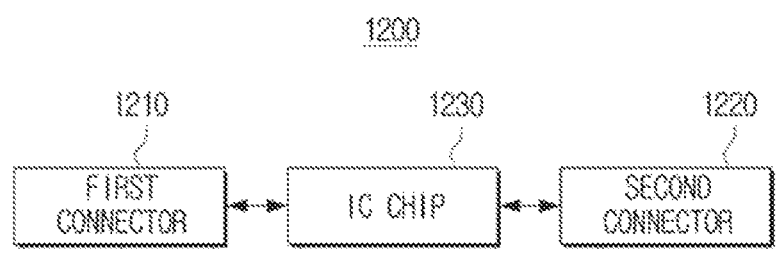
FIG. 12 is a diagram illustrating a display module according to an embodiment.

FIG. 12 is a diagram illustrating the display module according to an embodiment of the disclosure. Here, the display module may be one from among the plurality of display modules included in the display apparatus 100 described above.

Referring to FIG. 12, a display module 1200 may include a first connector 1210, a second connector 1220, and an IC chip 1230.

Here, the first connector 1210 may be connected with a first external module, and the second connector 1220 may be connected with a second external module. For example, the first connector 1210 may be connected with the processor 120 of the display apparatus 100, and the second connector 1220 may be connected with another display module (hereinafter, referred to as display module E) disposed adjacently to the display module 1200.

The first connector 1210 may receive the first signal from the first external module through a first pin of the first connector 1210, and receive the second signal from the first external module through the second pin of the first connector 1210. Here, the first signal may include information on the image corresponding to the display module 1200, and the second signal may include information on the image corresponding to the display module E. However, this is merely one embodiment, and the first signal may be a signal for controlling the display module 1200, and the second signal may be a signal for controlling the display module E.

The first signal may be transmitted to the IC chip 1230. Here, the IC chip 1230 may be a device which controls the driving of LEDs based on a signal received to the first pin of the connector, and according to an embodiment, the IC chip may be the LED driver IC chip. Accordingly, the display module 1200 may display an image based on the first signal.

The second signal may be transmitted to the second external module through the second connector 1220. In an example, the second signal may be transmitted to the display module E which is disposed adjacently to the display module 1200. To this end, the second connector 1220 may be connected with the connector of the second external module.

Specifically, the second pin of the first connector 1210 may be electrically connected with a first pin of the second connector 1220, and accordingly, the second signal received from the first external module through the second pin of the first connector 1210 may be transmitted to the first pin of the second connector 1220. The first pin of the second connector 1220 may be electrically connected with the first pin of the connector of the second external module, and accordingly, the second signal transmitted to the first pin of the second connector 1220 may be transmitted to the first pin of the connector of the second external module. In this case, the IC chip included in the second external module may display an image based on the second signal.

The second pin of the first connector 1210 may be electrically connected with the first pin of the second connector 1220 through the shifted pattern. Here, the shifted pattern may be a pattern arrayed in in a column which is shifted and not a pattern arrayed in one line on the PCB, and because the description thereof has been described in FIG. 5, the details are not repeated herein.

Figure 13:
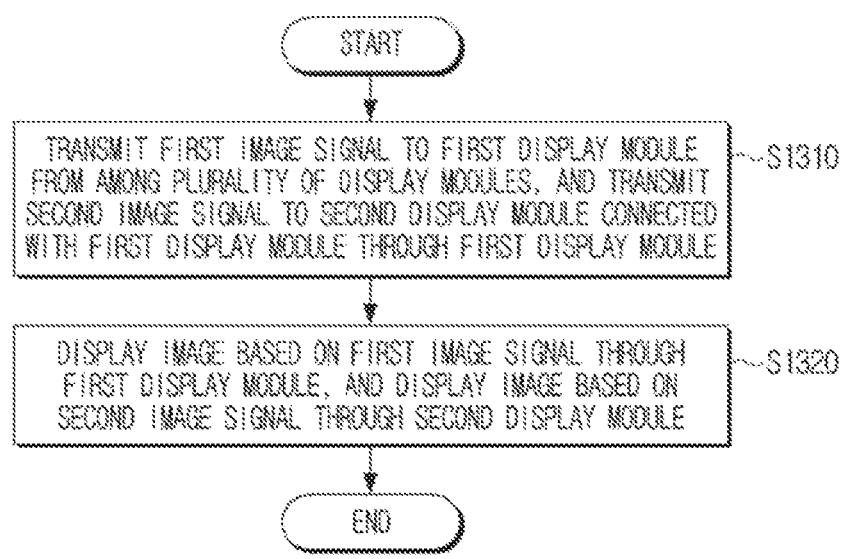
FIG. 13 is a flowchart illustrating a control method of a display apparatus according to an embodiment.

FIG. 13 is a flowchart illustrating a control method of the display apparatus according to an embodiment of the disclosure.

The display apparatus 100 may transmit the first image signal to the first display module from among the plurality of display modules, and transmit the second signal to the second display module connected with the first display module through the first display module (S1310).

The first display module may include the first connector, receive the first image signal through the first pin of the first connector, and receive the second image signal through the second pin of the first connector.

The second display module may include the second connector, and receive the second image signal through a first pin of the second connector from the first display module.

Thus, the second pin of the first connector may be electrically connected with the first pin of the second connector.

The display apparatus 100 may display an image based on the first image signal through the first display module, and display an image based on the second image signal through the second display module (S1320).

Specifically, the plurality of display modules may include the IC chip, and the IC chip may be set to display an image by processing the image signal received through the first pin of the connector included in the plurality of display modules. Accordingly, the first display module may display an image based on the first image signal received through the first pin of the first connector, and the second display module may display an image based on the second image signal received through the first pin of the second connector.

The first display module may include a third connector, and the second pin of the first connector may be electrically connected with a first pin of the third connector. Specifically, the second pin of the first connector and the first pin of the third connector may be electrically connected through the shifted pattern. Accordingly, the second image signal may be transmitted from the second pin of the first connector to the first pin of the third connector, and transmitted from the first pin of the third connector to the first pin of the second connector which is electrically connected with the first pin of the third connector.

In some embodiments, a non-transitory computer readable medium stored with a program may be provided which sequentially performs the control method of the display apparatus according to the disclosure.

The non-transitory computer readable medium may refer to a medium that stores data semi-permanently rather than storing data for a very short time, such as a register, a cache, or a memory, and is readable by a device. Specifically, the above-described various applications or programs may be stored and provided in the non-transitory computer readable medium such as, for example, and without limitation, a compact disc (CD), a digital versatile disc (DVD), a hard disc, a Blu-ray disc, a USB, a memory card, and/or a ROM.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus comprising:
a plurality of display modules; and
one or more processors configured to control the plurality of display modules to display an image,
wherein a first display module of the plurality of display modules comprises a first connector which is connected to the one or more processors,
wherein the first display module is configured to:
receive a first image signal through a first pin of the first connector from the one or more processors,
receive a second image signal through a second pin of the first connector, and
display an image based on the first image signal,
wherein a second display module of the plurality of display modules comprises a second connector which is connected to the first display module,
wherein the second display module is configured to:
receive the second image signal through a first pin of the second connector from the first display module, and
display an image based on the second image signal,
wherein the second pin of the first connector is electrically connected to the first pin of the second connector,
wherein the first display module comprises a third connector,
wherein the second pin of the first connector is electrically connected to a first pin of the third connector, and
wherein the second image signal is bypassed from the second pin of the first connector to the first pin of the third connector.

2. The display apparatus of claim 1, wherein each display module of the plurality of display modules comprises an integrated circuit (IC) chip configured to display an image by processing an image signal received through a first pin of a connector of a corresponding display module.

3. The display apparatus of claim 1, wherein the first pin of the second connector is electrically connected to the first pin of the third connector.

4. The display apparatus of claim 1, wherein the second pin of the first connector and the first pin of the third connector are electrically connected through a shifted pattern.

5. The display apparatus of claim 1, further comprising:
a bridge board electrically connected to the one or more processors and the first display module, and configured to transmit the first and second image signals received from the one or more processors to the first display module.

6. The display apparatus of claim 5, wherein the bridge board is connected to at least two display modules from among the plurality of display modules, and is further configured to transmit a plurality of image signals received from the one or more processors to the at least two display modules.

7. The display apparatus of claim 1, wherein the one or more processors is further configured to:
generate, based on identification information of the plurality of display modules, a plurality of image signals corresponding to the plurality of display modules, the plurality of image signals comprising the first image signal corresponding to the first display module and the second image signal corresponding to the second display module, and
transmit, to the first display module, the first image signal corresponding to the first display module and the second image signal corresponding to the second display module.

8. A control method of a display apparatus comprising a plurality of display modules, the control method comprising:
transmitting a first image signal to a first display module of the plurality of display modules, and transmitting a second image signal to a second display module of the plurality of display modules connected to the first display module through the first display module; and
displaying an image based on the first image signal through the first display module, and displaying an image based on the second image signal through the second display module,
wherein the first display module comprises a first connector, and the first display module is configured to receive the first image signal through a first pin of the first connector, and receive the second image signal through a second pin of the first connector,
wherein the second display module comprises a second connector, and the second display module is configured to receive the second image signal through a first pin of the second connector from the first display module,
wherein the second pin of the first connector is electrically connected to the first pin of the second connector,
wherein the first display module comprises a third connector,
wherein the second pin of the first connector is electrically connected to a first pin of the third connector, and
wherein the second image signal is bypassed from the second pin of the first connector to the first pin of the third connector.

9. The control method of claim 8, wherein each display module of the plurality of display modules comprises an integrated circuit (IC) chip configured to display an image by processing an image signal received through a first pin of a connector of a corresponding display module.

10. The control method of claim 8, wherein the first pin of the second connector is electrically connected to the first pin of the third connector.

11. The control method of claim 8, wherein the second pin of the first connector and the first pin of the third connector are electrically connected through a shifted pattern.

* * * * *